US007062065B2

(12) United States Patent
Dowdy

(10) Patent No.: US 7,062,065 B2
(45) Date of Patent: Jun. 13, 2006

(54) ANTI-COUNTERFEITING METHOD AND SYSTEM

(75) Inventor: Jacklyn M. Dowdy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 517 days.

(21) Appl. No.: 09/774,728

(22) Filed: Jan. 31, 2001

(65) Prior Publication Data

US 2002/0102008 A1 Aug. 1, 2002

(51) Int. Cl.
*G06K 9/00* (2006.01)

(52) U.S. Cl. ...................... 382/100; 382/135; 235/379; 356/71

(58) Field of Classification Search ................ 382/100, 382/135–140, 232, 233–243, 103, 112–119, 382/162, 169–172, 175, 181, 189, 194, 209, 382/274, 305, 286–297, 106, 108, 182; 194/205; 209/534; 356/71; 235/379, 380; 713/179, 713/180–186, 187; 902/7; 340/5.86, 5.85; 380/201; 345/421
See application file for complete search history.

(56) References Cited

U.S. PATENT DOCUMENTS 4,906,988 A * 3/1990 Copella ..................... 340/5.86
5,321,751 A * 6/1994 Ray et al. ................... 713/186
5,436,970 A * 7/1995 Ray et al. ................... 713/186
5,974,150 A * 10/1999 Kaish et al. ................ 713/179
6,003,763 A * 12/1999 Gallagher et al. .......... 235/379
6,137,892 A * 10/2000 Powell et al. .............. 382/100
6,456,729 B1 * 9/2002 Moore ........................ 382/103
6,580,819 B1 * 6/2003 Rhoads ....................... 382/135

FOREIGN PATENT DOCUMENTS

EP 0660275 A2 6/1995
GB 2101376 A 1/1983
JP 9134464 A 11/1995

OTHER PUBLICATIONS

English language version of the search report for the U.K. Patent Office for GB0201292.0 dated Oct. 28, 2002.

* cited by examiner

*Primary Examiner*—Matthew C. Bella
*Assistant Examiner*—Seyed Azarian

(57) ABSTRACT

An anti-counterfeiting system and method modifies the data within a first data set having data in a first data arrangement to create a second data arrangement for the first data set, determines whether data on an object is consistent with the data of the first or second data arrangement for the first data set, and accepts the object if the data on the object is determined to be consistent with the data of the first or second data arrangement for the first data set, else rejects the object.

20 Claims, 3 Drawing Sheets

ANTI-COUNTERFEITING METHOD AND SYSTEM

FIELD OF INVENTION

This invention relates to duplication devices in general and more specifically to an anti-counterfeiting method and system for use with counterfeit objects created by duplication devices.

BACKGROUND

Duplication devices, such as scanner devices, are well-known in the art and are able to reproduce copies of objects. For example, scanner devices produce machine-readable color image data signals that are representative of a scanned object, such as a photograph or a page of printed text. In a typical scanner application, the color image data signals produced by a scanner may be used by a computer system (e.g., a personal computer) to reproduce an image of the scanned object on a suitable display device, such as a cathode ray tube ("CRT") or liquid crystal display ("LCD"). Alternatively, the computer system may print the image of the scanned object on a printer connected to the computer system.

Scanner devices, printers, and the computer systems to which they may be connected continue to decrease in price while increasing in quality. Consequently, more people find themselves with home computer systems that include, among other things, scanners and printers of very high quality. Indeed, many persons now possess home computer systems so advanced that they are capable of producing copies of objects that are virtually indistinguishable from the original copied objects. While the duplication feature of home computer systems can be beneficial, it also tends to increase the risks of counterfeiting.

The situations in which counterfeiting poses a risk are far too numerous to list herein. One such example, however, is the risk of counterfeit tickets to sporting events, concerts, movies, shows, etc. especially when the tickets are offered for sale prior to the event for which the tickets will be used. When the tickets can be purchased and obtained in advance, the time between the ticket offering and the event may provide counterfeiters with the necessary time to create counterfeit tickets.

Counterfeiting risks can be especially problematic for online vendors. Along with the price reductions for home computer systems, other computer peripheral devices, such as modems, are also decreasing in price. Consequently, more people find themselves with home computer systems that include modems and are using those home computer systems to connect to the Internet.

Once connected to the Internet, the variety of things people can do online is far too numerous to fully list herein, especially when considering that new Internet uses are being discovered continuously. One such example, however, is purchasing tickets online. Virtually any type of ticket can now be purchased online.

Typically, after purchasing the online tickets, the consumer will be provided with the option of picking up the tickets at a will call window or having them mailed. In the first scenario, the consumer may be required to expend substantial amounts of time waiting in line at the will call window. In the second scenario, the consumer may be required to expend substantial sums of money for the mailing expenses especially if there is not sufficient time between the date of purchase and the date of the event to allow for regular mail and the consumer must pay for express delivery.

Ideally, the consumer would be provided with the option of printing out the tickets on a printer connected to the computer system. By providing such an option, however, counterfeiting becomes a significant risk especially in light of the advanced quality of currently available scanner devices and printers. Without anti-counterfeiting safeguards, the tickets once printed out could easily be duplicated with a scanner and printer.

The problems associated with counterfeiting, however, are in no way limited to online shopping for tickets or counterfeit objects produced with scanners and printers. Indeed, counterfeiting can be problematic in many other situations. For example, security access cards may be counterfeited thereby allowing unauthorized access into what would otherwise be secure facilities. Similarly, gift certificates, checks, etc. also are at risk of being counterfeited. Although these are but a few of the numerous examples in which counterfeiting poses a risk, one can easily surmise that counterfeiting is a very significant problem that can be very costly and frustrating to those involved.

SUMMARY OF THE INVENTION

Accordingly, a need remains for an anti-counterfeiting system for use with counterfeit objects created by duplication devices. Ideally, the system would be capable of first determining whether an object is genuine or counterfeit and then accepting or rejecting the object based on that determination. The system should also contain adequate anti-counterfeiting safeguards that would prevent, or at least hinder, the efforts of counterfeiters to pass off counterfeit objects as the original, authentic objects.

An anti-counterfeiting method according to one embodiment of the present invention includes the following steps: creating a first data set having data in a first data arrangement; modifying the data within the first data set to create a second data arrangement for the first data set; determining whether data on an object is consistent with the data of the first or second data arrangement for the first data set; and accepting the object if the data on the object is determined to be consistent with the data of the first or second data arrangement for the first data set, else rejecting the object.

Also disclosed is an anti-counterfeiting system which according to one embodiment of the invention comprises a first data set having data in a first data arrangement. The data of the first data set is modifiable to create a second data arrangement for the first data set. Data reading apparatus reads data on an object. A data processing system operatively associated with the data reading apparatus receives the data on the object from the data reading apparatus. The data processing system then determines whether the data on the object is consistent with the first or second data arrangement for the first data set. If the data processing system determines that the data on the object is consistent with the data of the first or second data arrangement for the first data set, the object is accepted. However, if the data processing system does not determine that the data on the object is consistent with the data of the first or second arrangement for the first data set, the object is rejected.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
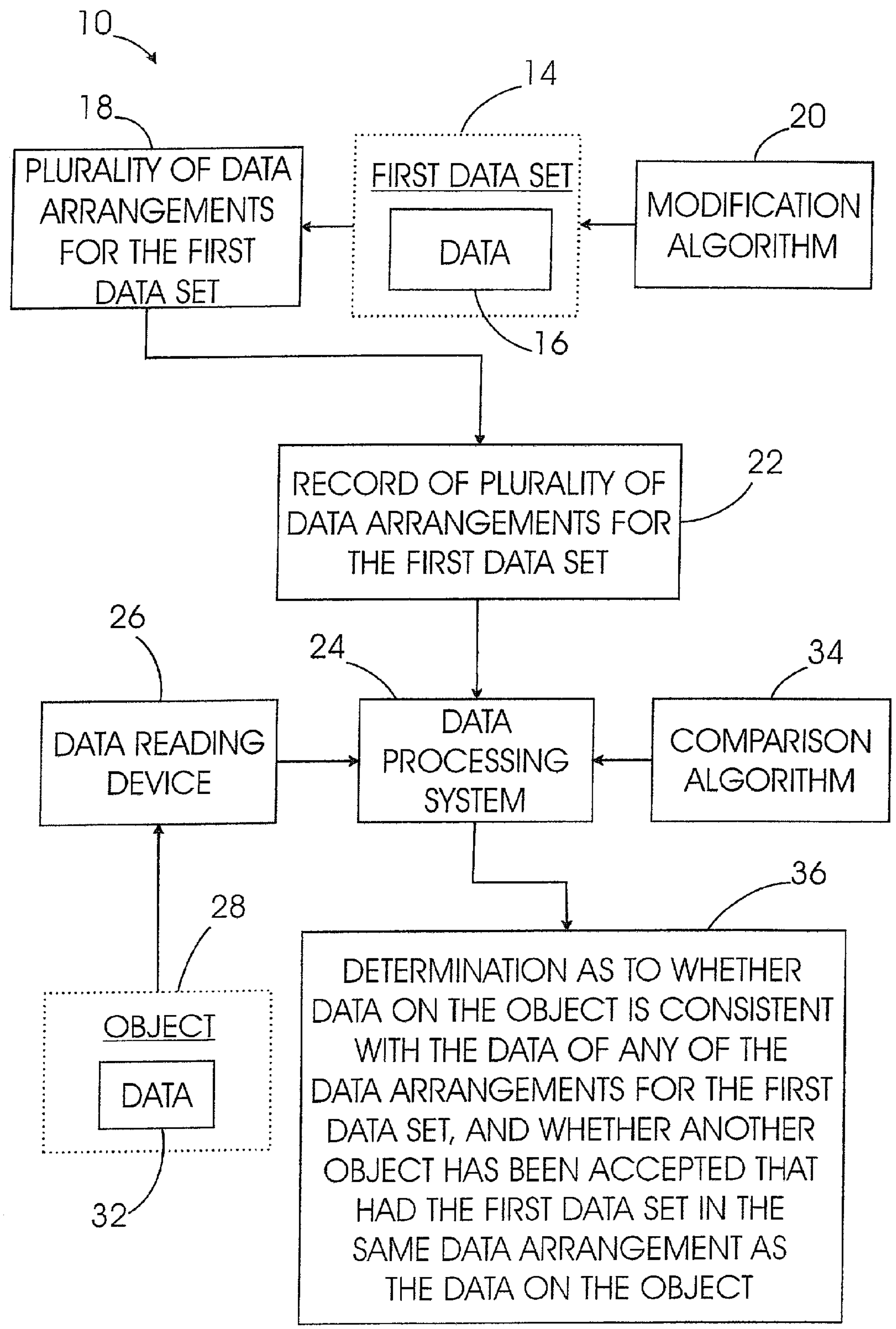
FIG. 1 is a block diagram representation of the components of a anti-counterfeiting system according to one embodiment of the present invention.
Figure 2:
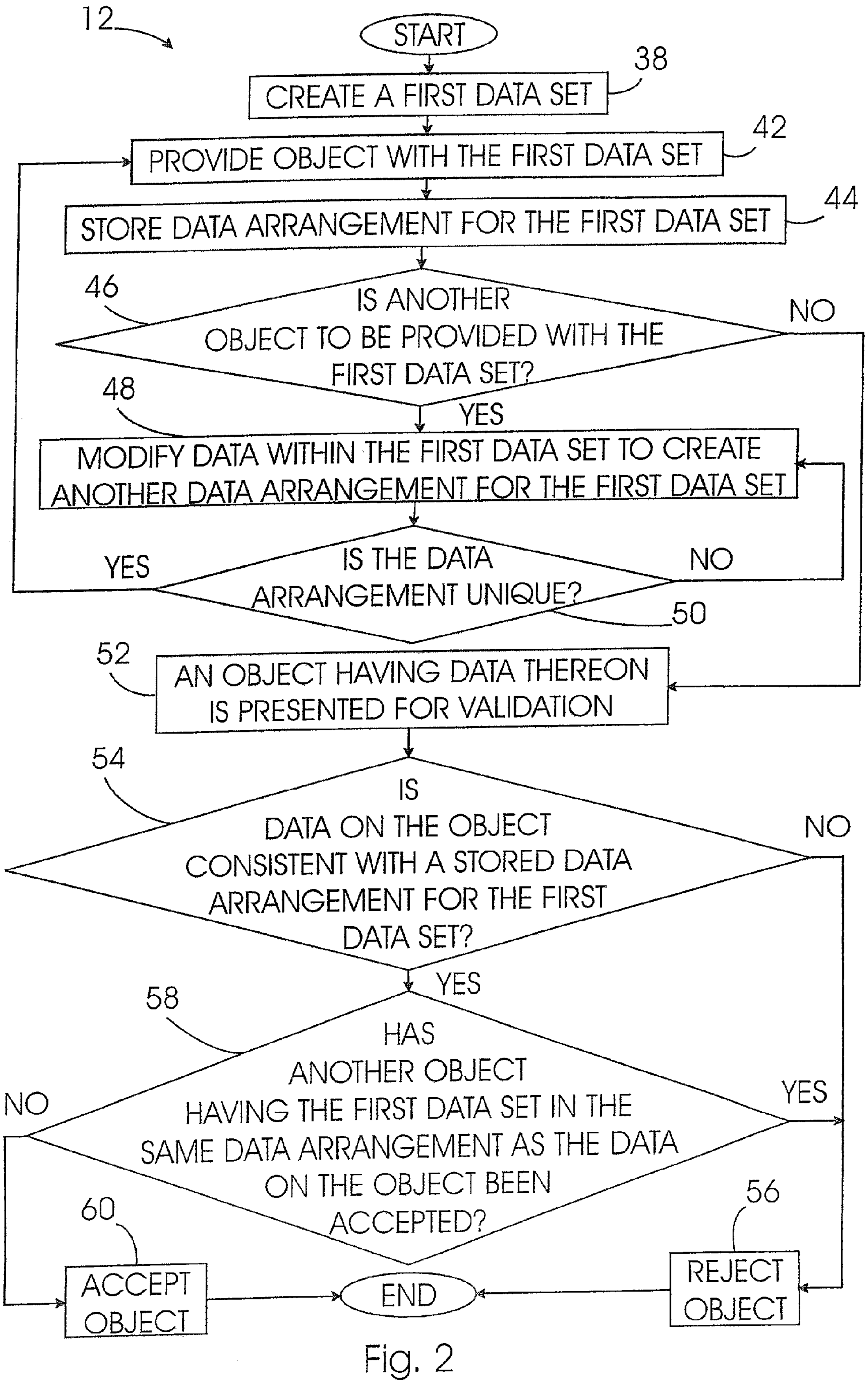
FIG. 2 is a flowchart representation of an anti-counterfeiting method according to one embodiment of the present invention.

The present invention comprises both a system 10 and a method 12 for determining whether an object is valid and for accepting or rejecting the object based on that determination. The system 10 (i.e., anti-counterfeiting system) is shown in FIG. 1, whereas the method 12 is illustrated in FIG. 2. Although the present invention is described herein as it could be used in conjunction with a host computer system (not shown), the present invention, as will be described in greater detail below, may be used in conjunction with any of a wide range of other devices or systems with processing and data storage capabilities.

The system 10 that performs the method 12 may comprise a first data set 14 having data 16 initially arranged in a first data arrangement. See FIG. 1. The data 16, however, may be modifiable so that another or second data arrangement may be created. In other words, the data 16 can be modified to a create a plurality of data arrangements 18 for the first data set 14. To modify the data 16 within the first data set, the system 10 may be provided with a modification algorithm 20 that modifies or rearranges the data 16 within the first data set 14. Each of the various data arrangements 18 for the first data set 14 may be stored in a record 22.

To carry out the functionality of the system 10, a data processing system 24 and data reading apparatus 26 (e.g., scanner, bar code reader, etc.) may be provided. When presented with an object 28 having data thereon 32, the data reading apparatus 26 may read the data 32 from the object 28 and provide the data 32 to the data processing system 24.

The data processing system 24 may receive the data 32 from the data reading device 26 and then compare the data 32 with the data 16 of the various data arrangements 18 for the first data set 14 stored in the record 22 in accordance with a comparison algorithm 34. The data processing system 24 may then make a determination 36 as to whether the data 32 on the object 28 is consistent with the data 16 of any of the data arrangements 18 for the first data set 14, and whether another object has been previously accepted that had the first data set 14 in the same data arrangement as the data 32 on the object 28. Based on the determination 36 made by the data processing system 24, the object 28 is either accepted or rejected.

As shown in FIG. 2, the method 12 according to one preferred embodiment of the present invention generally comprises the following steps. In the first step 38, the first data set 14 (e.g., bitmap of image data representative of an image 40, shown in FIG. 3) is created. The first data set 14 is then provided to an object (not shown) at step 42 with the particular data arrangement for the first data set 14 being stored at step 44. Next, if it is determined (step 46) that another object is to be provided with the first data set 14, the data 16 within the first data set 14 is modified at step 48 to create another data arrangement for the first data set 14. If the data arrangement created at step 48 is not unique (step 50), the data 16 within the first data set 14 will be modified again at step 48. Once a unique data arrangement is obtained, steps 42 through 50 are repeated for the new object. The number of times that steps 42 through 50 are repeated and the number of data arrangements 18 ultimately created will depend on the number of objects to be provided with the first data set 14.

Assuming that the object 28 (e.g., concert ticket with image provided thereon, smart card with data stored within its built-in memory, etc.) having data 32 thereon is presented for validation at step 52, a determination is made (step 54) as to whether the data 32 on the object 28 is consistent with the data 16 of any of the data arrangements 18 for the first data set 14 that were stored at step 44. If the data 32 is determined to not be consistent, the object 28 is rejected at step 56. But if the data 32 is determined to be consistent with the data of one of the data arrangements 18 for the first data set 14, a determination is then made at step 58 as to whether another object has been previously accepted that had the first data set 14 in the same data arrangement as the data 32 of the object 28. If another such object has been previously accepted, the object 28 is rejected at step 56. However, if no other object having the first data set 14 in the same data arrangement as the data 32 of the object 28 has been previously accepted, the object 28 is accepted at step 60.

An example in which one embodiment of the present invention could be utilized is in the sale of tickets to sporting events. Assuming a ticket is purchased whether online or otherwise, the ticket issued from that purchase may be provided with an image or indicia that is unique to that ticket. Indeed, each of the tickets issued for the respective sporting event may be provided with unique images. Later, when the ticket is presented by the ticket holder for admission to the sporting event, the ticket is first presented to a ticket accepting device (i.e., the data processing system 24 and the data reading apparatus 26) so that the ticket accepting device may scan the ticket (i.e., object 28). The ticket accepting device may then access a database (i.e., the record 22) to verify whether the ticket is valid. More specifically, the ticket accepting device may make a determination as to whether the image (i.e., data 32) on the ticket is consistent with any of the images (i.e., data arrangements 18 for the first data set 14) that have been provided to issued tickets and stored within the database. If it is determined to be consistent, the ticket accepting device may then determine whether any other tickets have been accepted that had the same image as the ticket presented by the ticket holder. Only if it is determined that the image on the ticket presented by the ticket holder is consistent with at least one of the images in the database and it is determined that no other ticket bearing the same image has been accepted will the ticket presented by the ticket holder be accepted. In other words, only the first ticket bearing a valid image will be accepted with all other tickets having that same image being rejected. The preceding example is for illustrative purposes only and is not intended to limit the teachings of the present invention.

A significant advantage of the present invention is that the present invention is able to first determine whether an object is valid and then accept or reject the object based on that determination. The present invention also helps to eliminate, or at least reduce, the risk of counterfeiting by allowing a user to limit the number of objects that are provided with the first data set 14 in a particular unique data arrangement. In other words, by minimizing the number of objects to be provided with a particular unique data arrangement, the user is able to minimize the potential number of counterfeit objects for each data arrangement and thus reduce the risks associated with counterfeiting.

Having briefly described the system 10 and the method 12 according to one embodiment of the present invention, as well as some of their more significant features and advantages, the system 10 and method 12 will now be described in detail. However, before proceeding with the description, it should be noted that although the system 10 and method 12 are described herein as they could be used in conjunction with a host computer system (not shown), they could also be used in any of a wide range of other devices or systems with processing and data storage capabilities, including but not limited to: mainframe computers, workstations, personal computers, automated teller machines (ATMs), smart cards, etc. Accordingly, the present invention should not be regarded as limited to use with any particular type of computer system.

With the foregoing considerations in mind, the system 10 and method 12 according to one embodiment of the present invention may be connected to a host computer system (not shown). One or more of the components of the system 10 may be built into or reside in the housing of the computer. Alternatively, the components of the system 10 can be separately housed from the computer system and be linked to the computer system over a remote network or other suitable connection. In any event, a suitable arrangement for the computer system and the components of the system 10 may be easily arrived at by persons having ordinary skill in the art after considering the requirements for the particular application and after becoming familiar with the teachings of the present invention.

Figure 3:
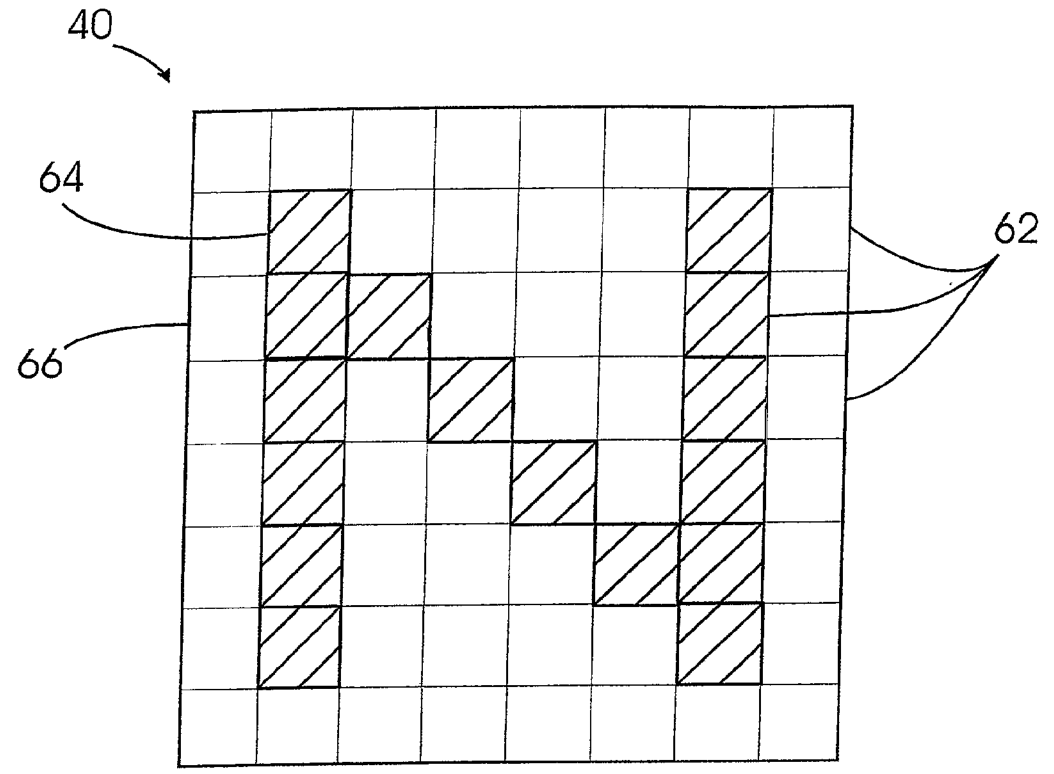
FIG. 3 is a plan view of an image formed by a plurality of pixels included within a bitmap of image data.

Regardless of the particular arrangement for the computer system, the system 10 according to the present invention may comprise a first data set 14 having data 16 in an initial or first data arrangement. See FIG. 1. The data 16 within the first data set 14 may comprise any of a wide range of data. In the embodiment shown and described herein, the first data set 14 comprises a bitmap of image data that is representative of an image 40. As shown in FIG. 3, the bitmap of image data may include a plurality of pixels 62 which form the letter "N", although other images, shapes and configurations are possible. Alternatively, the first data set 14 could comprise a bar code label (not shown) having indicia thereon representative of a label data set.

The first data set 14 may be stored on a computer readable storage device operatively associated with the computer system. Alternatively, other storage locations are possible as would be obvious to persons having ordinary skill in the art after having become familiar with the teachings of the present invention.

Referring now back to FIG. 1, the data 16 within the first data set 14 may be modifiable so that a plurality of data arrangements 18 can be created. To carry out the modifications of the data 16 within the first data set 14, a modification algorithm 20 may be provided. The modification algorithm 20 may comprise computer readable program code stored on a computer readable storage device operatively associated with the computer system in which the system 10 may be used. Alternatively, the modification algorithm 20 may be stored within the data processing system 24 and/or the data reading apparatus 26, both of which were briefly discussed above and are described in much greater detail below. In another alternative embodiment, a device (not shown) specially designed (e.g., "hard wired") may be provided that is operatively associated with the system 10. The specially designed device may be provided with the modification algorithm 20 and access the modification algorithm 20 to modify the data 16 within the first data set 14. In yet another embodiment, the modification algorithm 20 may also be stored within the object that is provided with the first data set 14. By way of example only, the object being provided with the first data set 14 may comprise a smart card (not shown) having a built-in microprocessor and memory. The modification algorithm 20 may be stored within the memory of the smart card so that it is accessible by the microprocessor. The microprocessor may access the modification algorithm 20 to modify the data 16 within the first data set 14 previously transferred or "downloaded" to the memory of the smart card.

Regardless of the particular storage location for the modification algorithm 20, the modification algorithm 20 may be programmed such that it rearranges or modifies the data 16 within the first data set 14 every time an object is provided with the first data set 14. For example, the data 16 may be modified every time before it is provided to an object. Alternatively, the data 16 may be modified every time after it is provided to an object. In other words, whenever an object is provided with the first data set 14, the data 16 within the first data set 14 is modified before the first data set 14 is provided to another object.

It is generally preferred, but not required, that each object that is provided with the first data set 14 be provided with the first data set 14 in a unique data arrangement. That is, a determination should be made as to whether the particular data arrangement for the first data set 14 about to be provided to the next object has been previously used (i.e., stored within the record 22). If it has been used, the modifications to the data 16 within the first data set 14 should continue until a unique data arrangement is obtained. By using unique data arrangement, no two objects should have the same data arrangement for the first data set 14. Thus, the risks of counterfeiting are greatly reduced because only one counterfeit object for each unique data arrangement is possible assuming, of course, that an up-to-date log is maintained of the data arrangements previously accepted.

Alternatively, the modification algorithm 20 may be programmed such that it modifies the data 16 within the first data set 14 after a preset number of objects have been provided with the first data set 14. The preset number could be selected by a user or be determined without any user intervention (e.g., preset by programmable code or randomly selected by a random number generator programmed into the modification algorithm 20). The preset number may remain constant throughout the various steps of method 12, although such is not required. In such an embodiment, however, step 58 (FIG. 2) would need to be modified so that a determination is made as to whether the preset number of objects, not just a single object, having the first data set 14 in the same data arrangement as the data 32 on the object 28 presented for validation has been accepted. If so, the object 28 is rejected.

In another alternative embodiment, the data 16 within the first data set 14 may be modified or rearranged periodically according to a time interval. The time interval could be selected by a user, or be determined without any user intervention (e.g., preset by programmable code or randomly selected by a random number generator programmed into the modification algorithm 20). In yet another alternative embodiment, the modification algorithm 20 could be programmed so as to create a preset number of data arrangements 18 for the first data set 14. The preset number could be selected by a user or be programmed into the algorithm 20 so that the number of data arrangements 18 is fixed without any user intervention (e.g., randomly selected by a random number generator). It is generally preferred, but not required, that the preset number of data arrangements 18 equal or exceed the number of objects that will be provided with the first data set 14 so that each of the objects may be provided with the first data set 14 in a unique data arrangement.

Regardless of when the modification algorithm 20 carries out the data modifications, the modifications to the data 16 within the first data set 14 may occur in a predictable sequence. By way of example only, the modification algorithm 20 could be programmed so that the color of the pixels 62 are changed in a predetermined sequence (e.g., from blue to red to yellow). By having predictable changes, the various transformations of the data 16 within the first data set 14 could be traced (i.e., backwards or forwards) and be used when comparing the data 32 on the object 28 to the first data set 14. Alternatively, the modification algorithm 20 may be programmed such that the data 16 within the first data set 14 is randomly rearranged.

Figure 4:
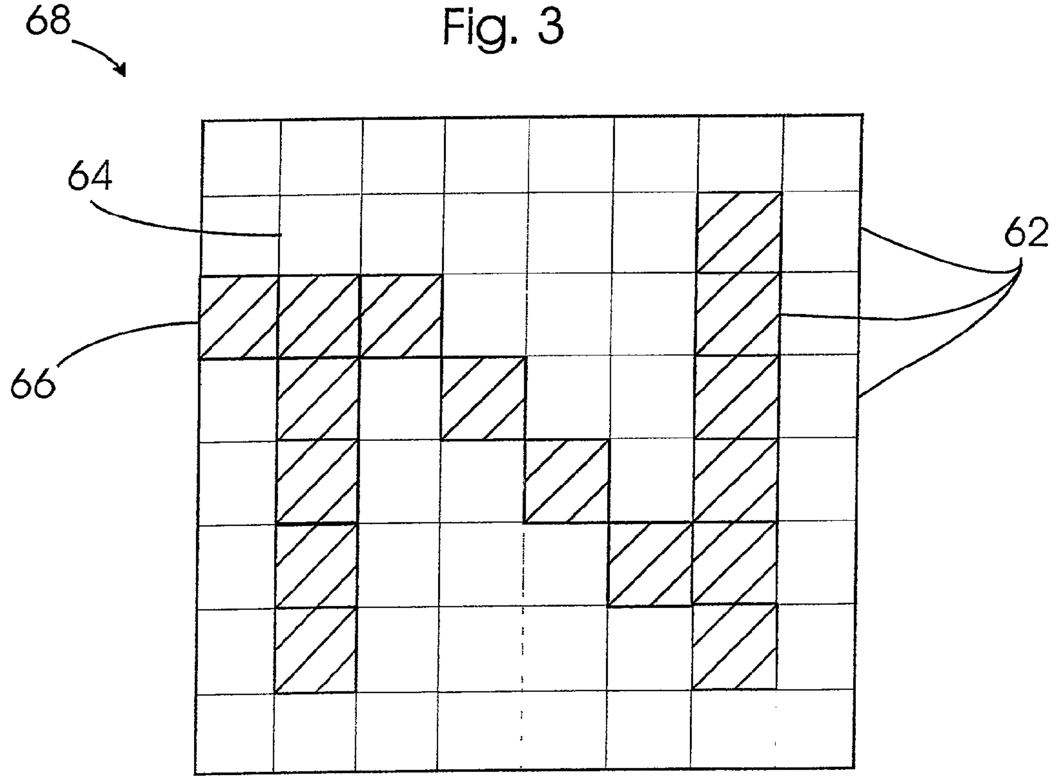
FIG. 4 is a plan view of a modified image after the pixels shown in FIG. 3 have been modified according to one preferred embodiment of the present invention.

The manner in which the data 16 within the first data set 14 is modified depends on the type of data being modified. In the embodiment shown and described herein, the first data set 14 comprises a bitmap of image data that includes the plurality of pixels 62. Thus, modifying the data 16 may comprise changing at least one of the attributes of at least one pixel of the plurality of pixels 62. For example, the color, hue, saturation, luminance, gray scale, on/off configuration, or any combination thereof could be changed for any number (i.e., one or more) of the pixels 62. As shown in FIGS. 3 and 4, pixels 64 and 66 have been modified to change or morph the image 40 to the image 68.

As mentioned earlier, each of the various data arrangements 18 for the first data set 14 may be maintained within the record 22. The record 22 may also maintain a log of the data arrangements that have been accepted by the system 10. By accessing the record 22, a particular data arrangement for the first data set 14 may be verified as unique. In addition and as will be described in much greater detail later, the record 22 may also be accessible to the data processing system 24 so that data processing system 24 may determine whether the data 32 on the object 28 presented for validation is consistent with the data 16 of one of the various data arrangements 18 for the first data set 14. The data processing system 24 may also access the record 22 to determine whether other objects have been previously accepted that had the first data set 14 in the same data arrangement as the data 32 of the object 28.

A time stamp associated with each of the data arrangements 18 for the first data set 14 may also be stored within the record 22 thereby allowing the objects that are provided with the first data set 14 to also be provided with the time stamp that corresponds to the particular data arrangement for the first data set 14 that the object was provided. Thus, when the object 28 is presented for validation, the data 32 on the object 28 need only be compared with the data arrangement for the first data set 14 that has the same or consistent time stamp as the time stamp for the data 32 of the object 28. In other words, unless it is determined that the data 32 is consistent with the data arrangement for the first data set 14 having the same or consistent time stamp, the object 28 is rejected.

The record 22 may be stored within a computer readable storage device operatively associated with the computer system in which the system 10 may be used. Alternatively, the record 22 may be stored within the data processing system 24 and/or the data reading apparatus 26. In another alternative embodiment, a device (not shown) specially designed (e.g., "hard wired") that is operatively associated with the system 10 may store the record 22.

The system 10 may also be provided with data reading apparatus 26. See FIG. 1. The data reading apparatus 26 may read the data 30 from the object 28 and provide the data 32 to the data processing system 24. The data reading apparatus 26 may comprise any of a wide range of devices capable of reading data from an object that are well-known in the art and readily commercially available. For example, the data reading apparatus 26 may comprise a scanner. Alternatively, the data reading apparatus 26 may comprise a bar code reader. In another alternatively embodiment, the data reading apparatus 26 may comprise a device that is capable of reading a data set stored within the memory of a smart card. In any event, the type of data reading apparatus 26 used in a particular application will depend on the type of data that needs to be read. However, since data reading devices are well-known in the art and the details of data reading devices themselves are not necessary to understand the present invention, the various components of the particular data reading device utilized in one preferred embodiment of the present invention will not be described in further detail herein.

To carry out the functionality of the system 10, a data processing system 24 may be provided that is operatively associated with the data reading apparatus 26. More specifically, and as explained in greater detail below, the data processing system 24 implements the functionality of the system 10 by first receiving the data 32 on the object 28 from the data reading device 26. The data processing system 24 then compares the data 32 with the data of the plurality of data arrangements 18 for the first data set 14 stored in the record 22 in accordance with a comparison algorithm 34.

As just mentioned, the data reading apparatus 26 reads the data 32 from the object and provides the data 32 to the data processing system 24. In the embodiment shown and described herein, the data processing system 24 determines whether the data 32 is consistent with the data of any of the various data arrangements 18 for the first data set 14. If it is, the data processing system 24 then determines whether any other objects has been previously accepted that had the first data set 14 in the same data arrangement as the data 32 on the object 28. Based on these two determinations, the object 28 is either accepted or rejected.

The data processing system 24 may be built into or reside in the data reading device 26. In other words, the data reading device 26 may include the data processing system 24 so that the processing functions occur within the data reading device 26. Alternatively, the data processing functions may occur within the host computer system. In other words, computer readable program code (e.g., via data processing software operated on microprocessors contained within the computer system) may be may provided that carries out the various data processing functions. In another alternative embodiment, the data processing functions may be split between the data reading device 26 and the computer system with each system performing portions of the processing functions. In any event, a suitable arrangement for the data processing system 24 may be easily arrived at by persons having ordinary skill in the art after considering the requirements for the particular application and after becoming familiar with the teachings of the present invention.

If any portion of the data processing system 24 is built into or resides in the data reading apparatus 26, it is generally desirable to provide the data processing system 24 with one or more communication ports (not shown) to allow data to be transferred or "downloaded" to the computer system in which the system 10 may be used. While any of a wide range of well-known communication ports and formats may be utilized, in one preferred embodiment, the data processing system 24 may be provided with a universal serial bus (USB) port (not shown) and/or an infra red (IR) serial port (also not shown). The USB port and/or IR serial port may be located on the scanner housing at any convenient location.

As mentioned earlier, the data processing system 24 may compare the data 32 of the object 28 with the data of the first data set 14 in accordance with the comparison algorithm 34. In the embodiment shown and described herein, the first data set 14 comprises the bitmap of image data that is representative of the first image 40 or 68 and that includes the plurality of pixels 62. The data 32 on the object 28 may also comprise a bitmap of image data that is representative a second image provided on the object 28 and that includes a plurality of pixels. Thus, the comparison algorithm 34 may be programmed such that the data processing system 24 compares each pixel of the plurality of pixels of the second bitmap of image data 32 with the corresponding pixel of the first data set 14 for each of the various data arrangements 18. In other words, the comparison algorithm 34 may be programmed such that the attributes (e.g, color, gray scale, on/off configuration, etc.) of each of the respective pixels of the second bitmap of image data 32 are compared to the attributes of the corresponding pixel of the first bitmap of image data 14 in each of the various data arrangements 18. The pixel-by-pixel comparison between the pixels of the first and second bitmaps of image data 14 and 32 may continue for each of the data arrangements 18 until a match is found, at which point the object 28 may be accepted, or until all of the various data arrangements 18 have been exhausted, at which point the object 28 may be rejected. Alternatively, if each of the data arrangements 18 are time stamped, then only the pixels for the data arrangement having the same or consistent time stamp with the time stamp for data 32 need be compared with the pixels of the second bitmap of image data 32.

In order to reduce the processing time that is needed to conduct the pixel-by-pixel comparison, the comparison algorithm 34 may instead be programmed such that the first and second bitmaps of image data 14 and 32 are first quantified into respective reference sums which are then compared to each other. More specifically, a first reference sum may be calculated for the first plurality of pixels 62 of the first bitmap of image data 14 in the first of the data arrangements 18. A second reference sum may also be calculated for the pixels of the second bitmap of image data 32, which is then compared to the first reference sum. If the first and second reference sums are determined to be consistent, the object 28 may be accepted. If not, however, a reference sum may be calculated for the next remaining data arrangement, which is then compared with the second reference number. Until a match is found, the process may be repeated for all of the various data arrangements 18. Alternatively, if each of the data arrangements 18 are time stamped, then only the reference sum for the data arrangement having the same or consistent time stamp with the time stamp for the data 32 may be calculated and compared to the second reference sum.

As discussed briefly above, FIG. 2 shows the various steps comprising the anti-counterfeiting method 12. It is to be understood, however, that the steps shown in FIG. 2 need not be performed in the particular order shown therein. In other words, the arrangement shown in FIG. 2, as are the arrangements shown in FIGS. 1 and 3–4, is merely illustrative and not intended to limit the teachings of the present invention.

As shown in FIG. 2, the method 12 according to one preferred embodiment of the present invention generally comprises the following steps. In the first step 38, the first data set 14 comprising the bitmap of image data representative of the image 40 (FIG. 3) is created. Alternatively, the first data set 14 could include any of a wide range of other data.

In the next step 42, the first data set 14 is provided on an object (not shown) with the data arrangement for the first data set 14 being stored at step 44. The object on which the first data set 14 may be provided may be almost any object imaginable. For example, the first data set 14, or more specifically, the image 40 may be provided on a paper ticket. Alternatively, the object being provided with the first data set 14 may comprise a smart card (not shown) having a built-in microprocessor and a built-in memory. To provide the smart card with the first data set 14, the first data set 14 may be transferred or "downloaded" to the memory of the smart card. The data 16 within the first data set 14 stored in the memory may then be modified by the smart card's microprocessor to create a plurality of data arrangements. The plurality of data arrangements, or at least the most recent data arrangement, may be stored within the memory of the smart card. An electronic clock may also be built-in to the smart card so that a time stamp for each of the various data arrangements created by the microprocessor may also be stored within the smart card's memory. The electronic clock may also allow for the synchronization of the modifications to the first data set 14 stored within the smart card's memory with the modifications to the original first data set 14 that may have been stored on a computer readable storage device operatively associated with the computer system in which the system 10 may be used. More specifically, in one embodiment, the modification algorithm 20 may be programmed to modify the first data set 14 according to a time interval and be stored within both the smart card's memory and on a computer readable storage device. By accessing the electronic clock and the modification algorithm 20 stored on the smart card's memory, the microprocessor of the smart card may modify the first data set 14 within the smart card's memory at the same time (i.e., synchronized) as the modification algorithm 20 stored on the computer readable storage device modifies the original first data set 14. Thus, at any given time, the most recent data arrangement of the first data set 14 within the smart card's memory is consistent with the most recent data arrangement for the original first data set 14.

Regardless of the type of objects that are being provided with the first data set 14, if it is determined at step 46 that another object is to be provided with the first data set 14, the data 16 within the first data set 14 is modified at step 48 to create another data arrangement for the first data set 14. If the data arrangement is not unique (step 50), the data 16 may modified again at step 48. Once a unique data arrangement is obtained, steps 42 through 50 are repeated for the new object. The number of times that steps 42 through 50 are repeated and the number of data arrangements 18 ultimately created will depend on the number of objects to be provided with the first data set 14.

Regardless of the number of objects that are provided with the first data set 14, an object 28 having data 32 thereon may be presented for validation at step 52. If so, a determination is made (step 54) as to whether the data 32 on the object 28 is consistent with the data of any of the data arrangements 18 for the first data set 14 that were stored at step 44. If the data 32 is determined to not be consistent, the object 28 is rejected at step 56. However, if the data 32 is determined to be consistent with the data of one of the data arrangements 18 for the first data set 14, then another determination is made at step 58 as to whether another object has been previously accepted that had the first data set 14 in the same data arrangement as the data 32 on the object 28. If no other such object has been previously accepted, the object 28 is accepted at step 60. However, if another object having the first data set 14 in the same data arrangement as the data 32 on the object 28 has been accepted, the object 28 is rejected (step 56).

As mentioned above, the present invention also contemplates methods including more steps than what are shown in FIG. 2. For example, the method 12 may further comprise displaying the first image 40 or 68 that the first data set 14 represents and displaying the second image (not shown) that the data 32 represents. The two images may be displayed side-by-side on a suitable display apparatus (not shown), such as a cathode ray tube ("CRT") or liquid crystal display ("LCD"), connected to the host computer system. Alternatively, the two images could be printed out on a printer connected to the host computer system.

The method 12 may also comprise the additional step of time stamping each of the data arrangements 18 for the first data set 14 so that the data 32 on the object 28 need only be compared at step 54 with the data arrangement having the same or consistent time stamp with the time stamp for data 32. In other words, unless it is determined that the data 32 on the object 28 is consistent with the data arrangement for the first data set 14 that has the same or consistent time stamp as the time stamp for data 32, the object 28 will be rejected at step 56.

It is to be understood that the computer readable program code can be conventionally programmed using any of a wide range of suitable computer readable programming languages that are now known in the art or that may be developed in the future. It is also to be understood that the computer readable program code can include one or more functions, routines, subfunctions, and subroutines, and need not be combined in a single software package.

It is contemplated that the inventive concepts herein described may be variously otherwise embodied and it is intended that the appended claims be construed to include alternative embodiments of the invention except insofar as limited by the prior art.

What is claimed is:

1. An anti-counterfeiting method, comprising:

creating from an object a first data set having data in a first data arrangement;

modifying the data within said first data set to create a second data arrangement for said first data set;

determining whether data on an object presented for validation is consistent with the data of the first or second data arrangement for said first data set by comparing said object presented for validation to both said first and said second data arrangements; and if the data on said object presented for validation is determined to be consistent with the data of the first or second data arrangement for said first data set, accepting said object presented for validation, else rejecting said object presented for validation.

2. The method of claim 1, further comprising, providing at least one object with said first data set.

3. The method of claim 2, wherein the data within said first data set is modified every time an object is provided with said first data set.

4. The method of claim 2, wherein an attribute of the data within said first data set is modified every time an object is provided with said first data set.

5. The method of claim 2, further comprising:

if the data on said object presented for validation is determined to be consistent with the data of the first data arrangement for said first data set:

determining whether another object having the first data set in the first data arrangement has previously been accepted;

rejecting said object presented for validation if it is determined that another object having the first data set in the first data arrangement has previously been accepted;

if the data on said object presented for validation is determined to be consistent with the data of the second data arrangement for said first data set:

determining whether another object having the first data set in the second data arrangement has previously been accepted; and rejecting said object presented for validation if it is determined that another object having the first data set in the second data arrangement has previously been accepted.

6. The method of claim 2, wherein said at least one object includes a memory, and wherein providing at least one object with said first data set comprises transferring the first data set to said memory.

7. The method of claim 6, wherein said at least one object further comprises a microprocessor, the microprocessor modifying the data within the first data set transferred to said memory to create a plurality of data arrangements for the first data set transferred to said memory, said memory storing at least one of said plurality of data arrangements.

8. The method of claim 7, wherein said at least one object further comprises a clock, said microprocessor accessing the clock to modify the first data set transferred to said memory according to a time interval.

9. The method of claim 1, further comprising, providing a plurality of objects with said first data set, and wherein the data within said first data set is modified after a preset number of the plurality of objects have been provided with said first data set.

10. The method of claim 9, further comprising:

if the data on said object presented for validation is determined to be consistent with the data of the first data arrangement for said first data set:

determining whether a preset number of other objects having the first data set in the first data arrangement have been accepted;

rejecting said object presented for validation if it is determined that a present number of other objects having the first data set in the first data arrangement have previously been accepted;

if the data on said object presented for validation is determined to be consistent with the data of the second data arrangement for said first data set:

determining whether a preset number of other objects having the first data set in the second data arrangement have previously been accepted; and rejecting said object presented for validation if it is determined that a present number of other objects having the first data set in the second data arrangement have previously been accepted.

11. The method of claim 1, further comprising, maintaining a record of the first and second data arrangements for said first data set.

12. The method of claim 1, wherein said first data set comprises a first bitmap of image data representative of a first image, the first bitmap of image data including a first plurality of pixels, and wherein modifying the data within said first data set comprises changing at least one attribute of at least one of said first plurality of pixels.

13. The method of claim 12, wherein the data on said object presented for validation comprises a second bitmap of image data representative of a second image, the second bitmap of image data including a second plurality of pixels.

14. The method of claim 13, wherein determining whether data on an object presented for validation is consistent with the data of the first or second data arrangement for said first data set comprises:

determining whether each pixel of the second plurality of pixels is consistent with a corresponding pixel of the first plurality of pixels in the first data arrangement;

if each pixel of the second plurality of pixels is determined to be consistent with the corresponding pixel of the first plurality of pixels in the first data arrangement, accepting said object presented for validation, else:

determining whether each pixel of the second plurality of pixels is consistent with a corresponding pixel of the first plurality of pixels in the second data arrangement; and if each pixel of the second plurality of pixels is determined to be consistent with the corresponding pixel of the first plurality of pixels in the second data arrangement, accepting said object presented for validation, else rejecting said object presented for validation.

15. The method of claim 13, wherein determining whether data on an object presented for validation is consistent with the data of the first or second data arrangement for said first data set comprises:

calculating a first reference sum for the first plurality of pixels in the first data arrangement;

calculating a second reference sum for said second plurality of pixels;

determining whether said second reference sum is consistent with said first reference sum;

if the second reference sum is determined to be consistent with the first reference sum, accepting said object presented for validation, else:

calculating a third reference sum for the first plurality of pixels in the second data arrangement;

determining whether said second reference sum is consistent with said third reference sum; and if the second reference sum is determined to be consistent with the third reference sum, accepting said object presented for validation, else rejecting said object presented for validation.

16. The method of claim 13, further comprising, displaying said first and second images.

17. The method of claim 1, wherein said first data arrangement has a first time stamp associated therewith, wherein said second data arrangement as a second time stamp associated therewith, wherein said data on said object presented for validation has a third time stamp associated therewith, and wherein determining whether data on an object presented for validation is consistent with the data of the first or second data arrangement for said first data set comprises:

determining whether the third time stamp is consistent with the first or second time stamp;

if the third time stamp is determined to be consistent with the first time stamp, rejecting said object presented for validation unless it is determined that the data on said object presented for validation is consistent with the data of the first data arrangement for said first data set;

if the third time stamp is determined to be consistent with the second time stamp, rejecting said object presented for validation unless it is determined that the data on said object presented for validation is consistent with the data of the second data arrangement for said first data set; and if the third time stamp is not determined to be consistent with the first or second time stamp, rejecting said object presented for validation.

18. An anti-counterfeiting system, comprising:

a first data set having data in a first data arrangement created from an object, the data within said first data set being modifiable to create a second data arrangement for said first data set;

data reading apparatus, said data reading apparatus reading data on an object; and a data processing system operatively associated with said data reading apparatus, the data processing system receiving the data on said object from said data reading apparatus, the data processing system determining whether the data on said object is consistent with the data of the first and second data arrangements for said first data set, said object being accepted if said data processing system determines that the data on said object is consistent with the data of the first and second data arrangement for said first data set, said object being rejected if said data processing system does not determine that the data on said object is consistent with the data of the first and second data arrangement for said first data set.

19. The anti-counterfeiting system of claim 18, further comprising at least one object, said at least one object comprising a memory, said first data set being transferable to the memory of said at least one object.

20. An anti-counterfeiting system, comprising:

a data processing system for modifying data within a computer readable storage device having a first data arrangement, created from an object, to create a second data arrangement for said data, for determining whether data on an object presented for validation is consistent with the data of the first and second data arrangement, and for accepting said object if the data on said object is determined to be consistent with the data of the first and second data arrangement, else of rejecting said object.

* * * * *

UNITED STATES PATENT AND TRADEMARK OFFICE

CERTIFICATE OF CORRECTION

PATENT NO. : 7,062,065 B2
APPLICATION NO. : 09/774728
DATED : June 13, 2006
INVENTOR(S) : Jacklyn M. Dowdy It is certified that error appears in the above-identified patent and that said Letters Patent is hereby corrected as shown below:

In column 12, line 53, in Claim 10, insert -- previously -- before “been”.

In column 12, line 55, in Claim 10, delete “present” and insert -- preset --, therefor.

In column 12, line 65, in Claim 10, delete “present” and insert -- preset --, therefor.

In column 13, line 60, in Claim 17, delete “as a” and insert -- has a --, therefor.

Signed and Sealed this

Eighteenth Day of August, 2009

David J. Kappos

David J. Kappos
*Director of the United States Patent and Trademark Office*